(12) United States Patent
Jiang (10) Patent No.: US 11,341,362 B2
(45) Date of Patent: May 24, 2022

(54) METHODS AND DEVICES FOR UPDATING FINGERPRINT TEMPLATE

(71) Applicant: BEIJING XIAOMI MOBILE SOFTWARE CO., LTD., Beijing (CN)

(72) Inventor: Zhongsheng Jiang, Beijing (CN)

(73) Assignee: BEIJING XIAOMI MOBILE SOFTWARE Co. Ltd., Beijing (CN)

( * ) Notice: Subject to any disclaimer, the term of this patent is extended or adjusted under 35 U.S.C. 154(b) by 0 days.

(21) Appl. No.: 16/266,738

(22) Filed: Feb. 4, 2019

(65) Prior Publication Data

US 2019/0251393 A1   Aug. 15, 2019

(30) Foreign Application Priority Data

Feb. 13, 2018   (CN) .......................... 201810150743.5

(51) Int. Cl.
*G06K 9/62* (2022.01)
*G06V 40/50* (2022.01)
*G06V 40/12* (2022.01)

(52) U.S. Cl.
CPC ....... *G06K 9/6255* (2013.01); *G06V 40/1347* (2022.01); *G06V 40/1365* (2022.01); *G06V 40/50* (2022.01)

(58) Field of Classification Search
CPC ............. G06K 9/6255; G06K 9/00926; G06K 9/00067; G06K 9/00087; G06K 9/0002; G06K 9/00–0012; G06F 3/041–047; G06V 40/12–1394; G06V 40/1347; G06V 40/1365; G06V 40/50; G06V 40/1306
See application file for complete search history.

(56) References Cited

U.S. PATENT DOCUMENTS

| | | | |
|---|---|---|---|
| 6,330,345 B1 | 12/2001 | Russo et al. | |
| 8,666,127 B1 * | 3/2014 | Kim | G06K 9/033 382/127 |
| 9,471,765 B1 | 10/2016 | Setterberg et al. | |
| 2003/0143665 A1 | 7/2003 | Petrenko et al. | |
| 2005/0138392 A1 | 6/2005 | Johnson et al. | |
| 2012/0014570 A1 * | 1/2012 | Abe | G06K 9/00067 382/124 |
| 2014/0294259 A1 * | 10/2014 | Lee | G06F 21/32 382/124 |

(Continued)

FOREIGN PATENT DOCUMENTS

| | | | |
|---|---|---|---|
| CN | 105631443 A | 6/2016 | |
| CN | 105809133 A | 7/2016 | |

(Continued)

OTHER PUBLICATIONS

Extended European Search Report Issued in EP Application No. 19156994.6, Jul. 1, 2019, (8p).

(Continued)

*Primary Examiner* — Roberto W Flores
(74) *Attorney, Agent, or Firm* — Arch & Lake LLP (57) ABSTRACT

A method of updating a fingerprint template in an electronic device is provided. In an example, the method includes: a blank image is acquired when a fingerprint sensor in the electronic device scans a fingerprint sensor region and no finger is detected; and it is determined whether the fingerprint template is to be updated according to the blank image.

8 Claims, 8 Drawing Sheets

(56) References Cited

U.S. PATENT DOCUMENTS

| | | | | |
|---|---|---|---|---|
| 2016/0063300 A1* | 3/2016 | Du | ............... | G06K 9/00087 |
| | | | | 382/124 |
| 2017/0053108 A1* | 2/2017 | Jakobsson | ............... | H04L 63/10 |
| 2017/0169275 A1* | 6/2017 | Mackey | ............... | G09G 3/3426 |
| 2018/0129861 A1* | 5/2018 | Kim | ............... | G06K 9/00013 |
| 2018/0277065 A1* | 9/2018 | Zuo | ............... | G09G 5/363 |
| 2019/0147217 A1* | 5/2019 | Kapinos | ............... | G06K 9/0008 |
| | | | | 382/124 |
| 2019/0340455 A1* | 11/2019 | Jung | ............... | G06K 9/00067 |
| 2020/0065554 A1* | 2/2020 | Nilsson | ............... | G06F 21/32 |

FOREIGN PATENT DOCUMENTS

| | | |
|---|---|---|
| CN | 106446775 A | 2/2017 |
| CN | 106716446 A | 5/2017 |
| CN | 107122761 A | 9/2017 |

OTHER PUBLICATIONS

Scheidat, Tobias et al., "Automatic Template Update Strategies for Biometrics" Technical Report, May 31, 2007, (5p).
First Office Action issued in Chinese Application No. 201810150743.5 dated Feb. 2, 2021 with English translation, (23p).
First Office Action issued in European Application No. 19156994.6 dated Dec. 22, 2020, (5p).
Second Office Action issued to Chinese Application No. 201810150743.5 dated Aug. 17, 2021 with English translation, (22p).

\* cited by examiner

METHODS AND DEVICES FOR UPDATING FINGERPRINT TEMPLATE

CROSS REFERENCE TO RELATED APPLICATION

This application claims priority to Chinese Patent Application No. 201810150743.5 and filed on Feb. 13, 2018, the entire content of which is incorporated herein by reference.

TECHNICAL FIELD

The present disclosure relates to updating a fingerprint template.

BACKGROUND

At present, a fingerprint sensor is configured in some electronic devices. A user can normally use the electronic device after placing a finger on the fingerprint sensor and passing the fingerprint identification. The accuracy of fingerprint matching may be relatively low due to user finger peeling, temperature changes, moisture changes, or wounds.

To improve the accuracy of fingerprint matching, some fingerprint identification algorithms may have template updating and template learning capabilities. For example, when a fingerprint image matches a fingerprint template, the fingerprint image is stored in a fingerprint template library as a new fingerprint template, and then when fingerprint information is subsequently acquired, the fingerprint information is compared with the new fingerprint template, thereby improving the accuracy of fingerprint matching.

SUMMARY

Based on this, the present disclosure provides a method of updating a fingerprint template, an electronic device and a non-transitory machine readable medium.

In first aspect, a method of updating a fingerprint template is provided, which includes: acquiring a blank image when a fingerprint sensor in the electronic device scans a fingerprint sensor region and no finger is detected; and determining whether the fingerprint template is to be updated according to the blank image.

In second aspect, an electronic device is provided, which includes: a processor; and a storage medium to store machine executable instructions; wherein when reading the machine executable instructions, the processor is caused to: acquire a blank image when a fingerprint sensor in the electronic device scans a fingerprint sensor region and no finger is detected; and determine whether the fingerprint template is to be updated according to the blank image.

In third aspect, a non-transitory machine readable medium is provided. The non-transitory machine readable medium stores machine executable instructions. When reading the machine executable instructions, a processor is caused to perform the method of the first aspect.

It shall be appreciated that the above general descriptions and the following detailed descriptions are merely illustrative and explanatory and cannot limit the present disclosure.

BRIEF DESCRIPTION OF DRAWINGS

The accompanying drawings, which are incorporated in and constitute a part of this specification, illustrate examples consistent with the present disclosure and, together with the description, serve to explain the principles of the disclosure.

DETAILED DESCRIPTION

Illustrative examples will be described in detail here with the examples thereof expressed in the drawings. Where the following descriptions involve the drawings, like numerals in different drawings refer to like or similar elements unless otherwise indicated. The examples described in the following examples do not represent all examples consistent with the present disclosure. Rather, they are merely device examples consistent with some aspects of the present disclosure as detailed in the appended claims.

The terminology used in the present disclosure is for the purpose of describing particular examples only and is not intended to limit the present disclosure. As used in this disclosure and the appended claims, the singular forms "a", "an", and "the" are intended to include the plural forms as well, unless the context clearly indicates otherwise. It should also be understood that the term "and/or" as used herein refers to and includes any and all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Under the condition that the fingerprint identification algorithm has template learning and template updating capabilities, when a fingerprint sensor has hardware damage or residues, in the fingerprint matching process, a updated fingerprint template eliminates influence regions (hereinafter also referred to as foreign object regions), such as hardware damages or residues. When the remaining part of the fingerprint image except the foreign object region matches the updated fingerprint template, the electronic device is automatically unlocked. In this case, the area of the matched region is reduced. When the two fingerprints are similar, the recognition error rate is increased, and the safety performance of the electronic device is reduced.

Figure 1:
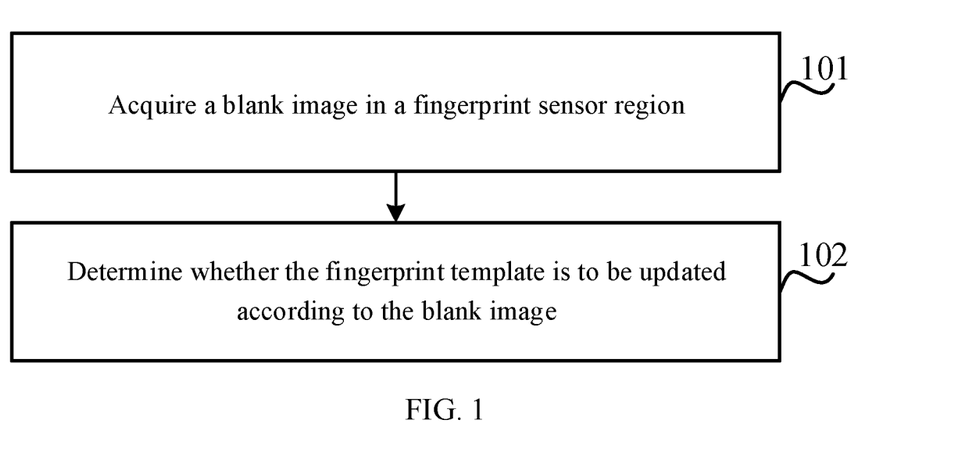
FIG. 1 is a flow diagram illustrating a method of updating a fingerprint template according to an example.

Based on this, the present disclosure provides a method of updating a fingerprint template. FIG. 1 is a flow diagram illustrating a method of updating a fingerprint template according to an example. The method may be configured in a fingerprint sensor or a processor. For brief, the method is performed by a processor in examples of the disclosure. Referring to FIG. 1, the method of updating a fingerprint template includes steps 101-102.

At step 101, a blank image is acquired when the fingerprint sensor in the electronic device scans a fingerprint sensor region and no finger is detected.

In an example, the fingerprint sensor is configured in the electronic device, such as a mobile terminal, and is configured to scan the fingerprint sensor region according to a set cycle to obtain the blank image of the fingerprint sensor region. The fingerprint sensor then sends the blank image to the processor.

The blank image refers to an image of a fingerprint sensor region acquired by the fingerprint sensor without being interfered by a user. It can be understood that when the hardware of the fingerprint sensor is damaged or there is a residue in the fingerprint sensor region, the hardware damage or the residue affects a capacitance distribution of the fingerprint sensor, and thus the blank image includes a foreign object region. The foreign object region included in the blank image corresponds to a hardware damage or a residue. The foreign object region shows an approximate shape and an approximate position of the hardware damage or the residue.

In practical applications, the fingerprint sensor may be a capacitive sensor. When a finger enters a sensing region of the fingerprint sensor, the capacitance value of each capacitance dot in the sensing region of the fingerprint sensor changes, and thus an output voltage of the fingerprint sensor changes. In an example, the processor may obtain the output voltage of the fingerprint sensor. The output voltage of the fingerprint sensor may refer to an average value of the voltage corresponding to each of the capacitance dots). When the output voltage of the fingerprint sensor exceeds a preset voltage range, the processor does not receive the blank image corresponding to the output voltage. When the output voltage of the fingerprint sensor is within the preset voltage range, for example, 5-50 mV, it indicates that the output voltage of the fingerprint sensor is stable and the acquired blank image is valid, and at this case the processor receives the blank image.

It will be appreciated that the processor may further obtain an output current of the fingerprint sensor. When the finger enters the sensing region of the fingerprint sensor, the capacitance value of each capacitance dot in the sensing region of the fingerprint sensor changes, and thus the current value in a loop formed by each of the capacitance dots and the power supply is different. In an example, the processor may obtain the output current of the fingerprint sensor. When the output current of the fingerprint sensor exceeds a preset current range, the processor does not receive the blank image corresponding to the output current. When the output current of the fingerprint sensor is within the preset current range, for example, 5-100 uA, it indicates that the output current of the fingerprint sensor is stable and the acquired blank image is valid, and at this case the processor receives the blank image.

In another example, the processor takes a blank image received within a preset period (such as, several milliseconds, several tens milliseconds) after fluctuation of the output (may be an output voltage or an output current) of the fingerprint sensor is ended as a final acquired blank image.

At step 102, it is determined whether the fingerprint template is to be updated according to the blank image.

After acquiring the blank image, the processor of the mobile terminal determines whether the blank image includes a foreign object region with an area exceeding an area threshold to obtain a determination result, and then determines whether the fingerprint template is to be updated according to the determination result. Determining whether the fingerprint template is to be updated according to the determination result includes: when the blank image includes a foreign object region with the area exceeding the area threshold, confirming not to update the fingerprint template.

In an example, when it is determined that the fingerprint template is not updated, the processor may not perform the operation of updating the fingerprint template in a preset period (for example, several minutes, or several hours) started from the determination time. That is, when detecting that the finger of the user is close to or pressing the fingerprint sensor, the processor determines whether an acquired fingerprint image matches the fingerprint template and confirms not to update the fingerprint template. When the fingerprint image matches the fingerprint template, the processor unlocks the mobile terminal. When the fingerprint image does not match the fingerprint template, the locked state of the mobile terminal is maintained. Therefore, when the blank image is abnormal, the frequency of determining whether the fingerprint template is to be updated or not can be reduced and thus the computing resource of the processor can be saved.

In an example, when it is determined that the fingerprint template is not updated, the processor does not use first acquired fingerprint image after the determined time to update the fingerprint template. After the first fingerprint image is acquired, the processor re-executes step 101. In this way, it can be found out in time whether the user removes the foreign object, and the efficiency of updating the fingerprint template can be ensured.

Determining whether the fingerprint template is to be updated according to the determination result may further include: when the blank image includes a foreign object region with an area less than or equal to the area threshold or no foreign object region, the fingerprint template may be updated. In an example, the method of updating a fingerprint template further includes: storing a fingerprint image matched with the fingerprint template into a fingerprint template library as a new fingerprint template.

In some cases, the number of fingerprint templates in the fingerprint template library is preset, for example, 100. In the early stage of using the mobile terminal, the number of fingerprint templates configured in the mobile terminal and fingerprint templates stored when the user registers is N, where N is an integer equal to or less than 100. In this case, the subsequent fingerprint image passing the fingerprint identification may be directly stored in the fingerprint template library as the fingerprint template. In this way, the number of the fingerprint templates can be stably increased, and thus the fingerprint template library can adapt to more fingerprint identification scenes.

In another example, the method of updating a fingerprint template further includes: removing the foreign object region with the area less than or equal to the area threshold in the fingerprint image based on an image processing algorithm to obtain a processed fingerprint image; storing the processed fingerprint image into the fingerprint template library; and deleting a previous fingerprint template in the fingerprint template library.

In some cases, the fingerprint template algorithm continuously updates the fingerprint template, such that the number of templates in the fingerprint template library is maintained at 100. At this case, an old fingerprint template in the fingerprint template library is replaced with a current processed fingerprint image, that is, when a new fingerprint template is added in the fingerprint template library, an old fingerprint template is removed from the fingerprint template library. In this way, the fingerprint template library does not occupy too many storage resources, and thus the updating speed and the matching accuracy of the fingerprint template can be ensured.

The size of the area threshold can be reasonably set according to a relationship between the area threshold and a similarity between the fingerprint image and the fingerprint template. For example, the ratio of the area threshold to the fingerprint sensor region may be 10% to 20%, and at this case, the similarity between the fingerprint image and the fingerprint template is 80% to 90%. Of course, those skilled in the art may adjust the area threshold according to a specific scene, and the area threshold is not limited herein.

It can be seen that the fingerprint template is not updated when the area of the foreign object region in the blank image exceeds the area threshold. In this way, the accuracy of the fingerprint template can be ensured, it is avoided that the fingerprint image with the hardware damage or the residue is used as the fingerprint template and that the fingerprint identification can be succeeded as long as fingerprints around the foreign object region passes the fingerprint matching, so that the accuracy of the fingerprint identification is prevented from being reduced and the safety performance of the electronic device is ensured.

Figure 2:
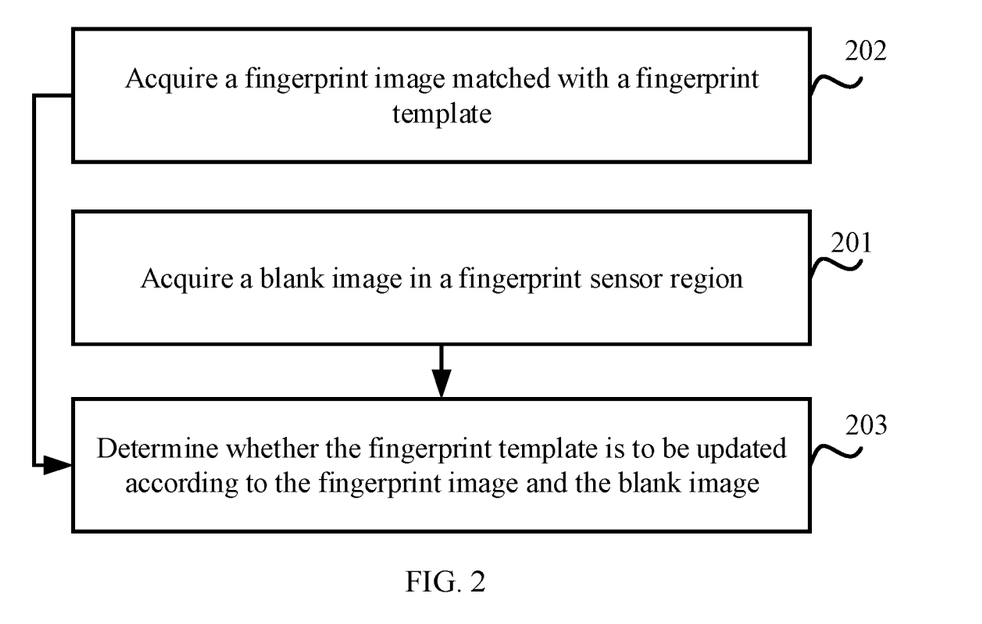
FIG. 2 is a flow diagram illustrating a method of updating a fingerprint template according to another example.

FIG. 2 is a flow diagram illustrating a method of updating a fingerprint template according to an example. Referring to FIG. 2, the method of updating a fingerprint template includes steps 201-203.

At step 201, a blank image is acquired when a fingerprint sensor in the electronic device scans a fingerprint sensor region and no finger is detected.

Step 201 is the same as step 101 and detailed description may refer to FIG. 1 and step 101, which are not repeated herein.

At step 202, a fingerprint image matched with a fingerprint template is acquired.

It is noted that, in examples of the disclosure, the sequence of step 201 and step 202 is not limited, for example, step 201 may precede step 202, and step 201 may follow step 202.

At step 203, it is determined whether the fingerprint template is to be updated according to the fingerprint image and the blank image. For example, the electronic device may determine whether to update the fingerprint template according to the fingerprint image, the blank image, and other factors such as an area threshold.

Figure 3:
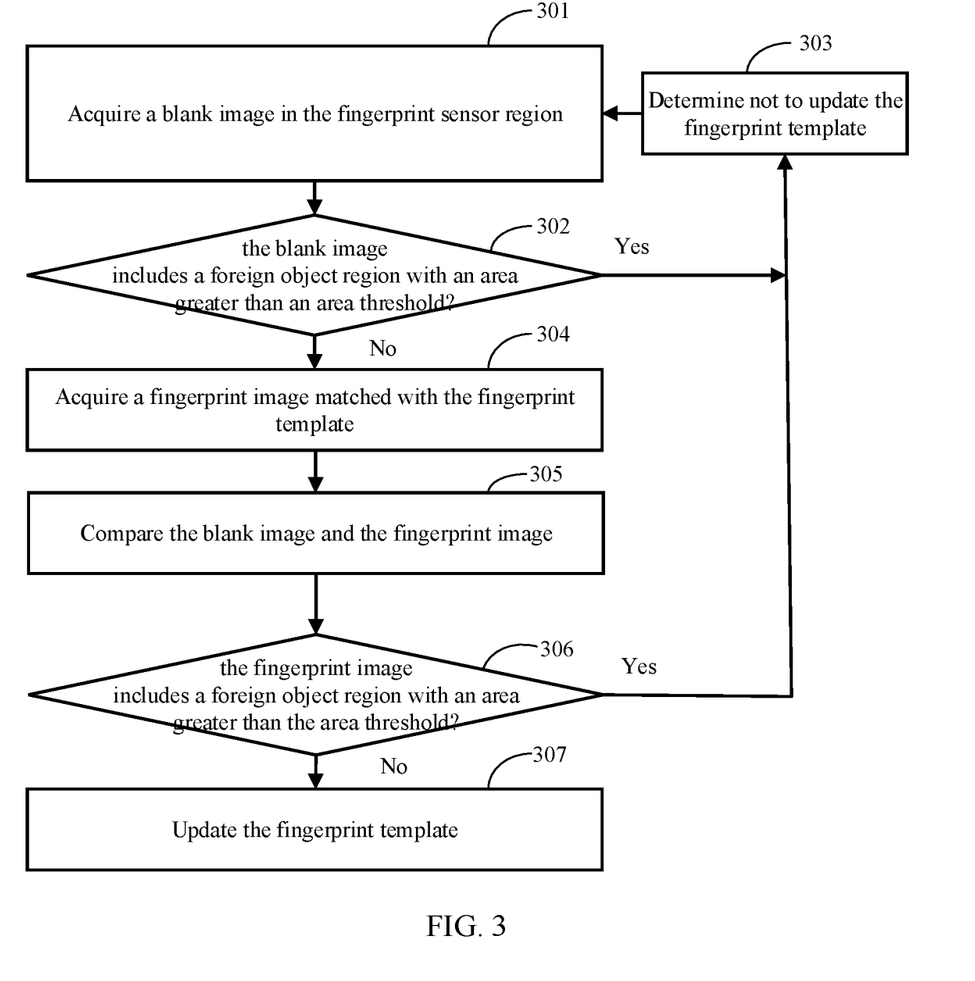
FIG. 3 is a flow diagram illustrating a method of updating a fingerprint template according to yet another example.

FIG. 3 is a flow diagram illustrating a method of updating a fingerprint template according to an example. Referring to FIG. 3, the method of updating a fingerprint template is performed by a processor in an electronic device and includes steps 301-307.

At step 301, a blank image in the fingerprint sensor region is acquired.

At step 302, it is determined whether the blank image includes a foreign object region with an area greater than an area threshold. When yes, step 303 is executed; and when no, step 304 is performed.

At step 303, it is determined that the fingerprint template is not updated and go back to step 301.

At step 304, a fingerprint image matched with the fingerprint template is acquired.

At step 305, the blank image and the fingerprint image are compared.

At step 306, it is determined whether the fingerprint image includes a foreign object region with an area greater than the area threshold. When yes, go back to step 303; and when no, step 307 is performed.

At step 307, the fingerprint template is updated.

In an example, the fingerprint template is updated when there is no foreign object region in the blank image and no foreign object region in the fingerprint image. In another example, the fingerprint template is updated when there is no foreign object region in the blank image and the fingerprint image includes a foreign object region with an area less than or equal to the area threshold. In yet another example, it is determined that the fingerprint template is not updated when there is no foreign object region in the blank image and the fingerprint image includes a foreign object region with an area exceeding the area threshold.

When there is no foreign object region in the blank image, it is determined that the fingerprint sensor has no hardware damage and that the fingerprint sensor region has no residue. At this case, when the fingerprint image includes a foreign object region, the processor may directly determine that the foreign object exists in the finger of the user, and prompt the user in a setting way, such as popping up a dialog box, a message and the like, so that the user can remove the foreign object in the finger in time.

In some cases, the fingerprint template is updated when the blank image includes a foreign object region with an area less than or equal to the area threshold and the fingerprint image includes a foreign object region with an area less than or equal to the area threshold. In some cases, it is determined that the fingerprint template is not updated when the blank image includes a foreign object region with an area less than or equal to the area threshold and the fingerprint image includes a foreign object region with an area exceeding the area threshold.

When the blank image includes a foreign object region, and the foreign object region in the blank image and the foreign object region in the fingerprint image have substantially the same shape, it may be determined that the hardware damage of the fingerprint sensor or the residue on the fingerprint sensor affects the fingerprint image. When the blank image includes a foreign object region, and the area of the foreign object region in the fingerprint image is larger than that of the foreign object region in the blank image, it may be determined that there is a foreign object in the finger of the user. At this case, the processor may prompt a user in a setting way, such as popping up a dialog box, a message and the like, so that the user can remove the foreign object in the finger in time.

Figure 4:
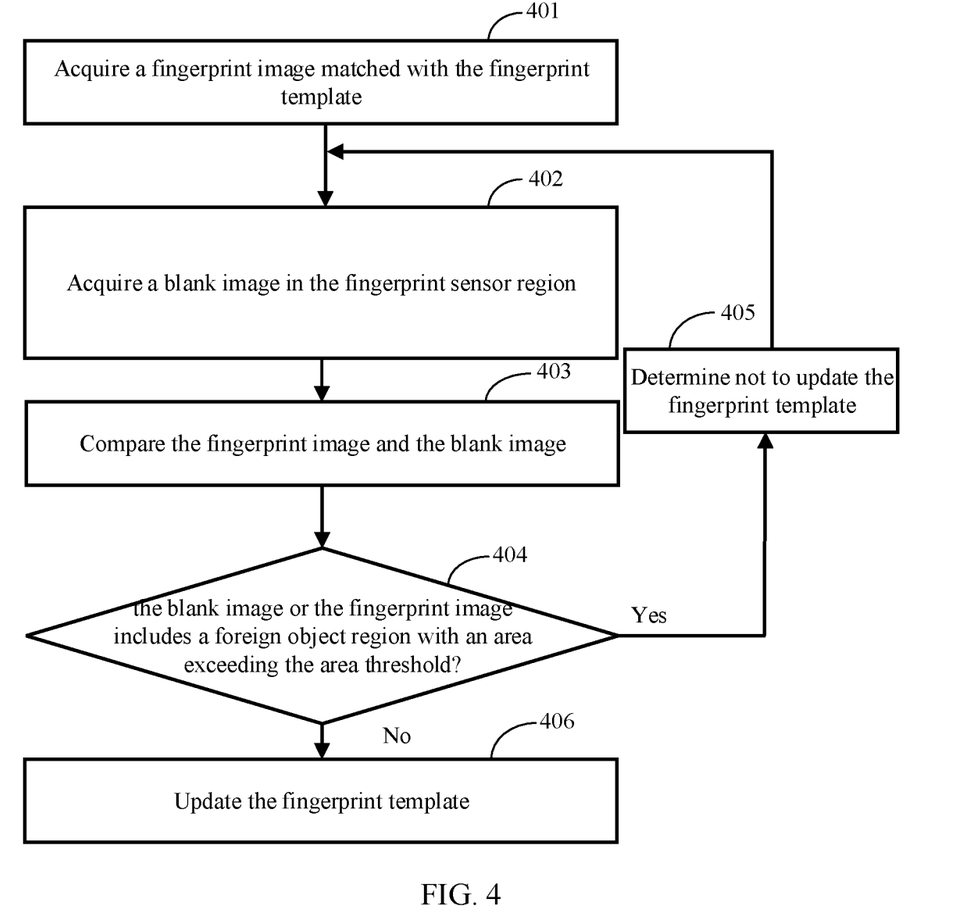
FIG. 4 is a flow diagram illustrating a method of updating a fingerprint template according to yet another example.

FIG. 4 is a flow diagram illustrating a method of updating a fingerprint template according to an example. Referring to FIG. 4, the method of updating a fingerprint template includes steps 401-406.

At step 401, a fingerprint image matched with the fingerprint template is acquired.

In an example, when detecting that the finger of the user is close or pressing the fingerprint sensor, the fingerprint sensor scans the fingerprint sensor region to acquire a fingerprint image and transmits the fingerprint image to the processor. Then the processor determines whether the fingerprint image matches the fingerprint template. When the fingerprint image does not matches the fingerprint template, the fingerprint sensor continues to scan the fingerprint sensor region. When the fingerprint image matches the fingerprint template, the fingerprint sensor acquires a blank image after the finger leaves the fingerprint sensor region and sends the blank image to the processor.

At step 402, a blank image in the fingerprint sensor region is acquired.

At step 403, the fingerprint image and the blank image are compared.

At step 404, it is determined whether the blank image or the fingerprint image includes a foreign object region with an area exceeding the area threshold. When yes, step 405 is performed; and when no, step 406 is performed.

At step 405, it is determined that the fingerprint template is not updated and go back to step 402.

At step 406, the fingerprint template is updated.

The processor compares the blank image with the fingerprint image and determines whether to update the fingerprint template according to the comparison result. In an example, the fingerprint template is updated when there is no foreign object region in the blank image and no foreign object region in the fingerprint image. In another example, the fingerprint template is updated when there is no foreign object region in the blank image and the fingerprint image includes a foreign object region with an area less than or equal to the area threshold. In yet another example, it is determined that the fingerprint template is not updated when there is no foreign object region in the blank image and the fingerprint image includes a foreign object region with an area exceeding the area threshold. In yet another example, the fingerprint template is updated when the blank image includes a foreign object region with an area less than or equal to the area threshold and the fingerprint image includes a foreign object region with an area less than or equal to the area threshold. In yet another example, it is determined that the fingerprint template is not updated when the blank image includes a foreign object region with an area exceeding the area threshold and the fingerprint image includes a foreign object region with an area exceeding the area threshold.

In this example, the user may be prompted about the comparison result in a setting way, and the prompting way may refer to the description about FIG. 3, which is not described in detail herein.

In above examples, the blank image and the fingerprint image both are considered. In a case that the blank image and the fingerprint image both include no foreign object or that the blank image and the fingerprint image both include a foreign object region with an area less than or equal to the area threshold, the fingerprint template is updated. In other cases, it is determined that the fingerprint template is not updated. In this way, the accuracy of the fingerprint template can be ensured, at some cases, such as a relatively large area of the hardware damage of the fingerprint sensor region, a relatively large residue in the fingerprint sensor region, a relatively large area in which the finger of the user is hurt or a relatively large residue in the finger of the user, it can be avoided that the fingerprint template is updated and thus the accuracy of the fingerprint identification is not reduced, so that the safety performance of the electronic device is ensured.

Figure 5:
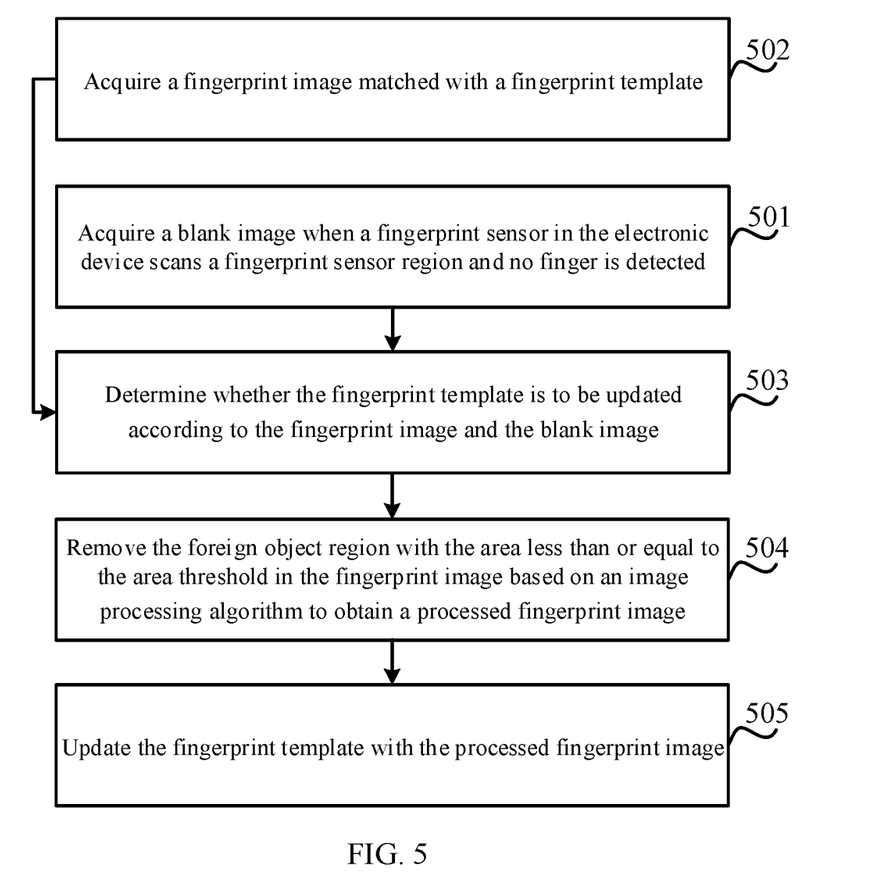
FIG. 5 is a flow diagram illustrating a method of updating a fingerprint template according to still another example.

FIG. 5 is a flow diagram illustrating a method of updating a fingerprint template according to an example. Referring to FIG. 5, the method includes steps 501-505.

At step 501, a blank image is acquired when a fingerprint sensor in the electronic device scans a fingerprint sensor region and no finger is detected.

At step 501 may refer to FIGS. 1-4, which is not described herein.

At step 502, a fingerprint image matched with a fingerprint template is acquired.

Step 502 may refer to FIGS. 1-4, which is not described herein.

At step 503, it is determined whether the fingerprint template is to be updated according to the fingerprint image and the blank image.

Step 503 may refer to FIGS. 1-4, which is not described herein.

At step 504, the foreign object region with the area less than or equal to the area threshold in the fingerprint image is removed based on an image processing algorithm to obtain a processed fingerprint image.

In some cases, the processor removes the foreign object region in the fingerprint image based on the image processing algorithm when the blank image includes a foreign object region with an area less than the area threshold and the fingerprint image includes a foreign object region with an area less than the area threshold.

The image processing algorithm may be an image processing algorithm well known to those skilled in the art, and the image processing algorithm is used to remove the foreign object region from the corresponding fingerprint image. Of course, an image processing algorithm with a fingerprint repairing function can be used to adjust the fingerprints according to the trend of the fingerprints around the foreign object region, so that a processed fingerprint image is obtained.

At step 505, the fingerprint template is updated with the processed fingerprint image.

The fingerprint template is updated with the processed fingerprint image. The processed fingerprint image without the foreign object region is used as the fingerprint template, so that the accuracy of the fingerprint template can be improved, the accuracy of the fingerprint identification can be improved, and the safety performance of the electronic device is ensured.

Figure 6:
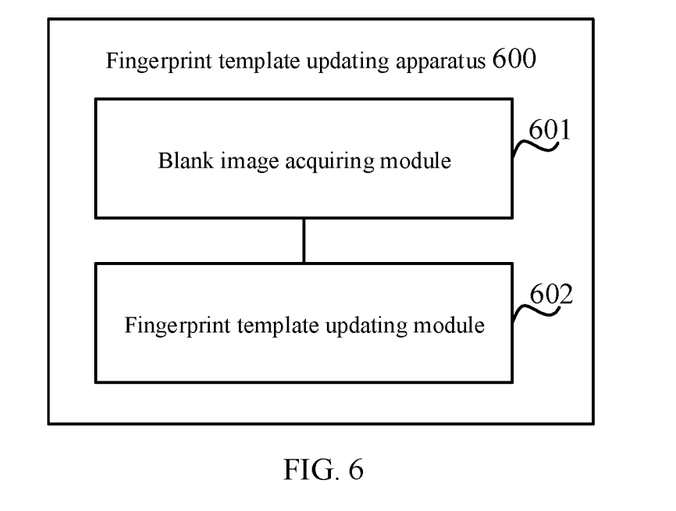
FIG. 6 is a block diagram of an apparatus for updating a fingerprint template according to one or more examples.

An apparatus for updating a fingerprint template is provided by examples of the present disclosure. FIG. 6 is a block diagram of an apparatus for updating a fingerprint template according to an example. Referring to FIG. 6, the apparatus 600 for updating a fingerprint template includes:

a blank image acquiring module 601, configured to acquire a blank image when a fingerprint sensor in the electronic device scans a fingerprint sensor region and no finger is detected;

a fingerprint template updating module 602, configured to determine whether the fingerprint template is to be updated according to the blank image.

Figure 7:
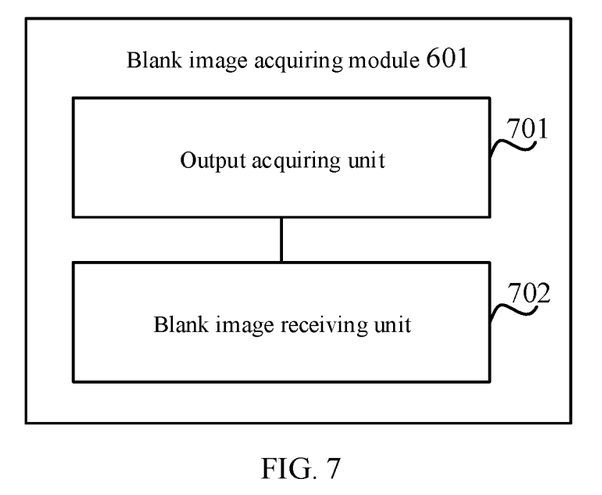
FIG. 7 is a block diagram of an apparatus for updating a fingerprint template according to one or more examples.

In an example, FIG. 7 is a block diagram of an apparatus for updating a fingerprint template according to an example. On the basis of the apparatus for updating a fingerprint template shown in FIG. 6, referring to FIG. 7, the blank image acquiring module 601 includes:

an output acquiring unit 701, configured to acquire an output of the fingerprint sensor; and a blank image receiving unit 702, configured to receive a blank image acquired by the fingerprint sensor when the output of the fingerprint sensor is within a set range.

Figure 8:
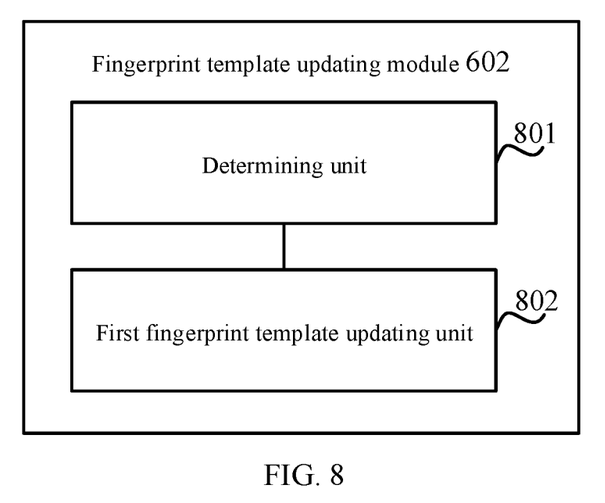
FIG. 8 is a block diagram of an apparatus for updating a fingerprint template according to one or more examples.

In an example, FIG. 8 is a block diagram of an apparatus for updating a fingerprint template according to an example. On the basis of the apparatus for updating the fingerprint template shown in FIG. 6, referring to FIG. 8, the fingerprint template updating module 602 includes:

a determining unit 801, configured to determine whether the blank image includes a foreign object region with an area greater than an area threshold; and a first fingerprint template updating unit 802, configured to confirm not to update the fingerprint template when the blank image includes a foreign object region with an area greater than the area threshold, and update the fingerprint template when the blank image does not include any foreign object region with an area greater than the area threshold.

Figure 9:
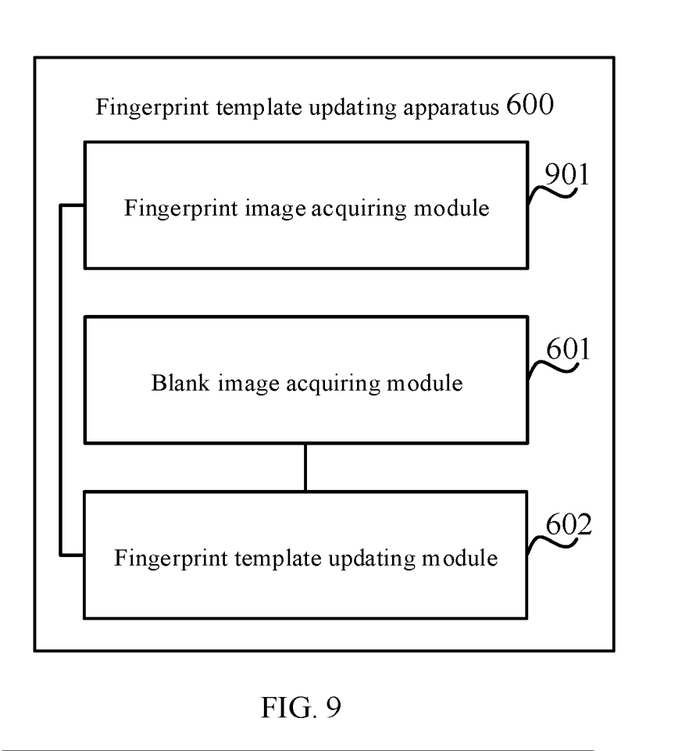
FIG. 9 is a block diagram of an apparatus for updating a fingerprint template according to one or more examples.

In an example, FIG. 9 is a block diagram of an apparatus for updating a fingerprint template according to an example. On the basis of the apparatus for updating a fingerprint template shown in FIG. 6, referring to FIG. 9, the apparatus further includes:

a fingerprint image acquiring module 901, configured to obtain a fingerprint image matched with the fingerprint template.

The fingerprint template updating module 602 is further configured to determine whether the fingerprint template is to be updated according to the fingerprint image and the blank image when the fingerprint image matches the fingerprint template, determining, by the electronic device.

Figure 10:
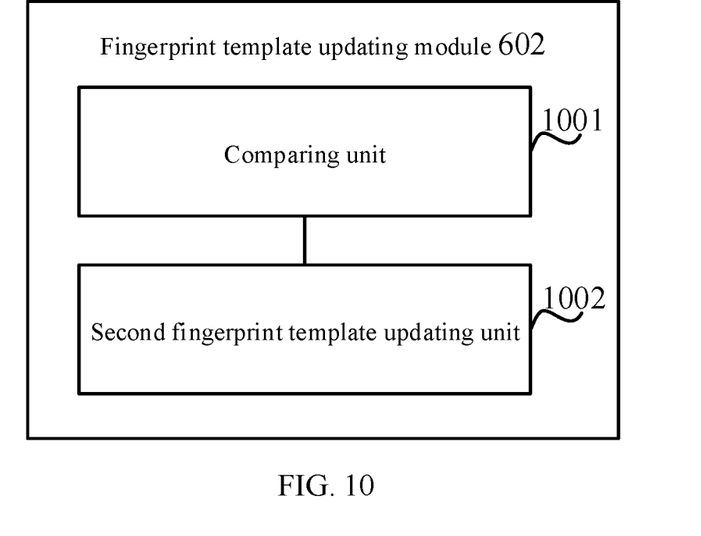
FIG. 10 is a block diagram of an apparatus for updating a fingerprint template according to one or more examples.

In an example, FIG. 10 is a block diagram of an apparatus for updating a fingerprint template according to an example. On the basis of the apparatus for updating the fingerprint template shown in FIG. 9, referring to FIG. 10, the fingerprint template updating module 602 further includes:

a comparing unit 1001, configured to compare the fingerprint image with the blank image and send a comparison result to a second fingerprint template updating unit 1002; and the second fingerprint template updating unit 1002, configured to update the fingerprint template when the fingerprint image includes no foreign object region or a foreign object region with an area less than or equal to the area threshold.

In an example, the second fingerprint template updating unit 1002 is further configured to update the fingerprint template when the fingerprint image a foreign object region with an area less than or equal to the area threshold and the blank image a foreign object region with an area less than or equal to the area threshold.

Figure 11:
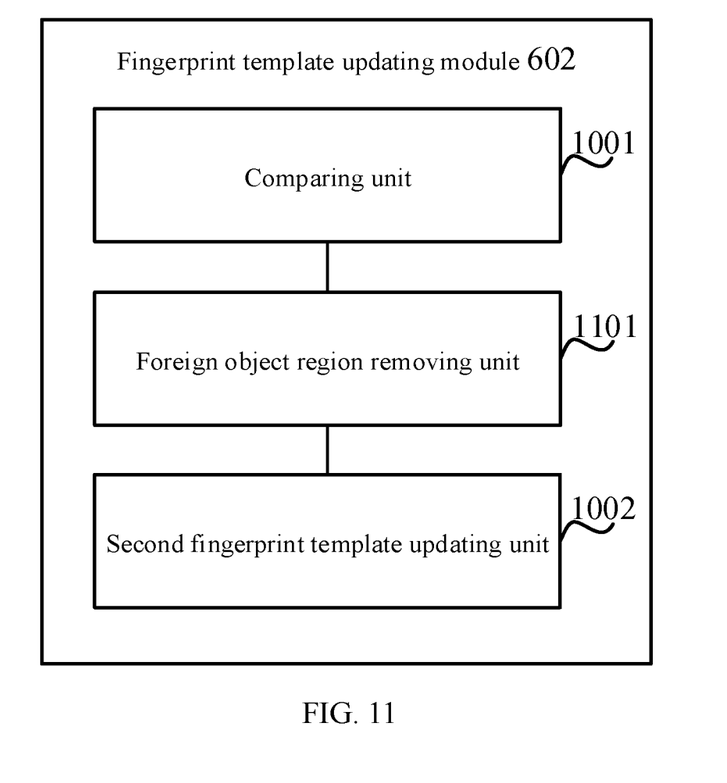
FIG. 11 is a block diagram of an apparatus for updating a fingerprint template according to one or more examples.

In an example, FIG. 11 is a block diagram of an apparatus for updating a fingerprint template according to an example. On the basis of the apparatus for updating the fingerprint template shown in FIG. 10, referring to FIG. 11, the fingerprint template updating module 602 further includes:

a foreign object region removing unit 1101, configured to remove the foreign object region with the area less than or equal to the area threshold in the fingerprint image based on an image processing algorithm to obtain a processed fingerprint image.

The second fingerprint template updating unit 1002 is further configured to update the fingerprint template with the processed fingerprint image.

In an example, the second fingerprint template updating unit 1002 is further configured to confirm not to update the fingerprint template when the fingerprint template includes a foreign object region with the area greater than the area threshold.

It is noted that the apparatus for updating a fingerprint template provided by examples of the present disclosure substantially corresponds to the method of updating a fingerprint template, and since the steps of the method of updating a fingerprint template have been described in detail in the above examples, the apparatus examples may refer to the method examples. In addition, with the change of the application scene, the method of updating the fingerprint template may also make corresponding adjustment, and the apparatus for updating the fingerprint template may also adopt different functional components to re-adjust, and further detail is omitted.

Figure 12:
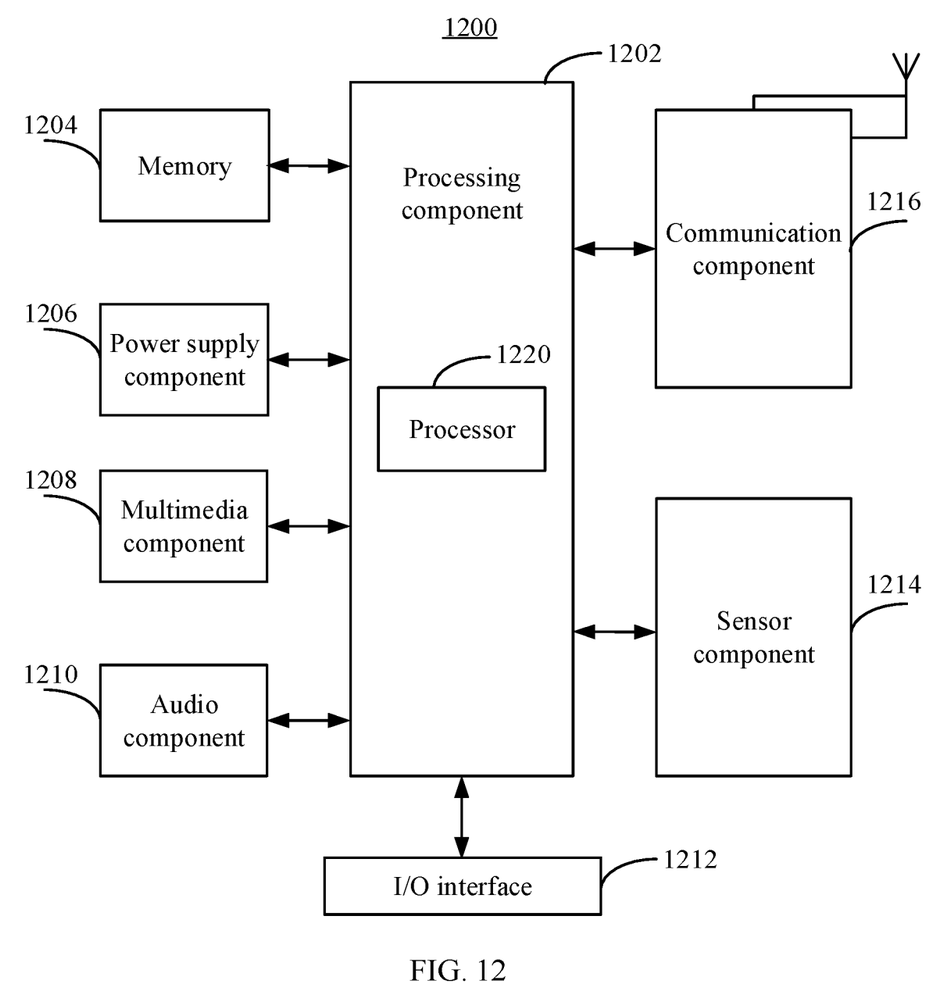
FIG. 12 is a block diagram of an electronic device according to an example.

As shown in FIG. 12, it is a block diagram of an electronic device according to an example. The electronic device 1200 may be a mobile phone, a computer, a digital broadcasting terminal, a message transceiver, a game console, a tablet device, a medical device, a fitness facility, and a personal digital assistant.

With reference to FIG. 12, the electronic device 1200 may include one or more of: a processing component 1202, a memory 1204, a power supply component 1206, a multimedia component 1208, an audio component 1210, an Input/Output (I/O) interface 1212, a sensor component 1214, and a communication component 1216.

The processing component 1202 generally controls the overall operations of the electronic device 1200, such as operations associated with display, calling, data communication, camera operation and recording operation. The processing component 1202 may include one or more processors 1220 for executing instructions to complete all or part of steps of the above-described method. Besides, the processing component 1202 may include one or more modules to facilitate interactions between the processing component 1202 and other components. For example, the processing component 1202 may include a multimedia module to facilitate the interaction between the multimedia component 1208 and the processing component 1202. In an example, when reading the machine executable instructions, the processor 1220 is caused to perform the above method.

The memory 1204 is configured to store different types of data to support the operations of the electronic device 1200. Examples of such data include instructions of any application program or method operable on the electronic device 1200, contact data, telephone directory data, messages, pictures, videos, and the like. The memory 1204 may be implemented by any type of volatile or non-volatile storage device or a combination thereof, such as a Static Random Access Memory (SRAM), an Electrically Erasable Programmable Read-Only Memory (EEPROM), an Electrically Programmable Read-Only-Memory (EPROM), a Programmable Read-Only-Memory (PROM), a Read-Only Memory (ROM), a magnetic memory, a flash memory, a magnetic disk or an optical disk.

The power supply component 1206 provides power for different components of the electronic device 1200. The power supply component 1206 may include a power management system, one or more power sources, and other components associated with generating, managing and distributing power for the electronic device 1200.

The multimedia component 1208 may include a screen for providing an output interface between the electronic device 1200 and a user. In some examples, the screen may include a Liquid Crystal Display (LCD) and/or a Touch Panel (TP). When the screen includes a touch panel, the screen may be implemented as a touch screen to receive input information from a user. The touch panel may include one or more touch sensors to sense touch, slide and gestures on the touch panel. The touch sensor may not only sense the boundary of a touch or slide motion but also detect duration and pressure related to the touch or slide operation.

The audio component 1210 is configured to output and/or input an audio signal. For example, the audio component 1210 may include a microphone (MIC). When the electronic device 1200 is in an operating mode, such as a call mode, a recording mode and a speech recognition mode, the microphone is configured to receive an external audio signal. The received audio signal may be further stored in the memory 1204 or transmitted via the communication component 1216.

The I/O interface 1212 provides an interface between the processing component 1202 and a peripheral interface module. The peripheral interface module may be a keyboard, a click wheel, a button and the like. Such buttons may include but not limited to: a home button, a volume button, a start button and a lock button.

The sensor component 1214 may include one or more sensors for providing state assessments in different aspects for the electronic device 1200. For example, the sensor component 1214 may detect the on/off state of the electronic device 1200, and relative locations of components, such as a display and a small keyboard of the electronic device 1200. The sensor component 1214 may also detect a position change of the electronic device 1200 or a component of the electronic device 1200, the presence or absence of contact of a user with the electronic device 1200, an orientation or acceleration/deceleration of the electronic device 1200 and a temperature change of the electronic device 1200. The sensor component 1214 may include a proximity sensor configured to detect a nearby object without any physical contact. The sensor component 1214 may also include an optical sensor, such as a CMOS or CCD image sensor for being used in imaging application. In some examples, the sensor component 1214 may also include an acceleration sensor, a gyroscope sensor, a magnetic sensor, a pressure sensor, or a temperature sensor.

The communication component 1216 is configured to facilitate wired or wireless communication between the electronic device 1200 and other devices. The electronic device 1200 may access a wireless network based on a communication standard, such as WIFI, 2G or 3G, or a combination thereof. In an example, the communication component 1216 receives a broadcast signal or broadcast related information from an external broadcast management system via a broadcast channel. In an example, the communication component 1216 may also include a Near Field Communication (NFC) module to facilitate short-range communications. For example, the NFC module may be implemented based on Radio Frequency Identification (RFID) technology, Infrared Data Association (IrDA) technology, Ultra-Wide Band (UWB) technology, Bluetooth (BT) technology and other technology.

In an example, the electronic device 1200 may be implemented by one or more of an Application Specific Integrated Circuit (ASIC), a Digital Signal Processor (DSP), a Digital Signal Processor (DSPD), a Programmable Logic Device (PLD), a Field Programmable Gate Array (FPGA), a controller, a microcontroller, a microprocessor or other electronic components, so as to perform the above method.

In an example, the present disclosure further provides a non-transitory machine-readable storage medium storing machine executable instructions, such as memory 1204 to store instructions. The instructions may be executed by processor 1220 in the electronic device 1200 to implement the above methods as shown in FIGS. 1-5. In an example, the non-transitory machine-readable storage medium includes ROM, RAM, CD-ROM, magnetic tape, soft disk and optical data storage.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

After considering the description and practicing the present disclosure, those skilled in the prior art may easily conceive of other implementations of the present disclosure. The present disclosure is intended to encompass any variations, uses and adaptive changes of the present disclosure. These variations, uses and adaptive changes follow the general principle of the present disclosure and include common knowledge or conventional technical means in the prior art not disclosed in the present disclosure. The description and examples herein are intended to be illustrative only and the real scope and spirit of the present disclosure are indicated by the claims of the present disclosure.

It shall be appreciated that the present disclosure is not limited to the precise structures described above and shown in the accompanying drawings and may be modified or changed without departing from the scope of the present disclosure.

What is claimed is:

1. A method for updating a prestored fingerprint template, comprising:
   acquiring, by an electronic device, a fingerprint image of a finger;
   determining whether the fingerprint image matches the prestored fingerprint template in a fingerprint template library;
   in response to determining that the fingerprint image matches the prestored fingerprint template,
   acquiring, by the electronic device, a blank image when a fingerprint sensor in the electronic device scans a fingerprint sensor region and no finger is detected, wherein acquiring the blank image comprises:
      obtaining an output of the fingerprint sensor in response to detecting no finger when the fingerprint sensor scans the fingerprint sensor region, the output including at least one of an output voltage or an output current, and
      when the output of the fingerprint sensor is within a set range indicating that the output of the fingerprint is stable and the blank image is valid, receiving the blank image acquired by the fingerprint sensor;
   after acquiring the fingerprint image matching the prestored fingerprint template and the blank image, determining, by the electronic device, an area of a first foreign object region in the fingerprint image;

determining, by the electronic device, an area of a second foreign object region in the blank image;

in response to determining that the area of the first foreign object region is greater than the area of the second foreign object region, outputting, by the electronic device, a prompt indicating that the finger has a residue and/or the finger is hurt, and confirming, by the electronic device, not to update the prestored fingerprint template; and in response to confirming that the prestored fingerprint template is not updated, an operation of updating the prestored fingerprint template is not performed in a preset period, wherein the preset period starts from when no updates of the prestored fingerprint template is confirmed.

2. The method of claim 1, further comprising:

in response to determining that both of the area of the first foreign object region and the area of the second foreign object region are less than or equal to an area threshold, updating, by the electronic device, the prestored fingerprint template with the fingerprint image.

3. The method of claim 2, wherein updating, by the electronic device, the prestored fingerprint template with the fingerprint image comprises:

removing, by the electronic device, the foreign object region with an area less than or equal to the area threshold in the fingerprint image based on an image processing algorithm to obtain a processed fingerprint image;

updating, by the electronic device, the prestored_fingerprint template with the processed fingerprint image; and deleting a previous fingerprint template in the fingerprint template library.

4. The method of claim 1, further comprising:

in response to determining that the area of the first foreign object region or the area of the second foreign object region is greater than the area threshold, confirming, by the electronic device, not to update the prestored fingerprint template.

5. An electronic device, comprises:

a processor; and a storage medium to store machine executable instructions;

wherein when executed, the machine executable instructions cause the processor to:

acquire a fingerprint image of a finger;

determine whether the fingerprint image matches a prestored fingerprint template in a fingerprint template library;

in response to determining that the fingerprint image matches the prestored fingerprint template, acquire a blank image when a fingerprint sensor in the electronic device scans a fingerprint sensor region and no finger is detected, wherein acquiring the blank image comprises:

obtaining an output of the fingerprint sensor in response to detecting no finger when the fingerprint sensor scans the fingerprint sensor region, the output including at least one of an output voltage or an output current, and when the output of the fingerprint sensor is within a set range indicating that the output of the fingerprint is stable and the blank image is valid, receiving the blank image acquired by the fingerprint sensor;

after acquiring the fingerprint image matching the prestored fingerprint template and the blank image, determine an area of a first foreign object region in the fingerprint image;

determine an area of a second foreign object region in the blank image;

in response to determining that the area of the first foreign object region is greater than the area of the second foreign object region, output a prompt indicating that the finger has a residue and/or the finger is hurt;

in response to determining that both of the area of the first foreign object region and the area of the second foreign object region are less than or equal to an area threshold, update the prestored fingerprint template with the fingerprint image;

in response to determining that the area of the first foreign object region or the area of the second foreign object region is greater than the area threshold, outputting a prompt indicating that the finger has a residue and/or the finger is hurt and confirm not to update the prestored fingerprint template; and in response to confirming that the prestored fingerprint template is not updated, an operation of updating the prestored fingerprint template is not performed in a preset period, wherein the preset period starts from when no updates of the prestored fingerprint template is confirmed.

6. The device of claim 5, wherein when updating the prestored fingerprint template with the fingerprint image, the processor is further caused to:

remove the foreign object region with an area less than or equal to the area threshold in the fingerprint image based on an image processing algorithm to obtain a processed fingerprint image;

update the prestored fingerprint template with the processed fingerprint image; and delete a previous fingerprint template in the fingerprint template library.

7. A non-transitory machine readable medium storing machine executable instructions, the machine executable instructions cause a processor to perform acts comprising:

acquiring a fingerprint image of a finger;

determining whether the fingerprint image matches a prestored fingerprint template in a fingerprint template library;

in response to determining that the fingerprint image matches the prestored fingerprint template, acquiring a blank image when a fingerprint sensor in an electronic device scans a fingerprint sensor region and no finger is detected, wherein acquiring the blank image comprises:

obtaining an output of the fingerprint sensor in response to detecting no finger when the fingerprint sensor scans the fingerprint sensor region, the output including at least one of an output voltage or an output current, and when the output of the fingerprint sensor is within a set range indicating that the output of the fingerprint is stable and the blank image is valid, receiving the blank image acquired by the fingerprint sensor;

after acquiring the fingerprint image matching the prestored fingerprint template and the blank image, determining an area of a first foreign object region in the fingerprint image;

determining an area of a second foreign object region in the blank image;

in response to determining that the area of the first foreign object region is greater than the area of the second foreign object region, outputting a prompt indicating that the finger has a residue and/or the finger is hurt;

in response to determining that both of the area of the first foreign object region and the area of the second foreign object region are less than or equal to an area threshold, updating the prestored fingerprint template with the fingerprint image;

in response to determining that the area of the first foreign object region or the area of the second foreign object region is greater than the area threshold, outputting a prompt indicating that the finger has a residue and/or the finger is hurt and confirming not to update the prestored fingerprint template; and in response to confirming that the prestored fingerprint template is not updated, an operation of updating the prestored fingerprint template is not performed in a preset period, wherein the preset period starts from when no updates of the prestored fingerprint template is confirmed.

8. The non-transitory machine readable medium of claim 7, wherein updating the prestored fingerprint template with fingerprint image comprises:

removing the foreign object region with an area less than or equal to the area threshold in the fingerprint image based on an image processing algorithm to obtain a processed fingerprint image;

updating the prestored fingerprint template with the processed fingerprint image; and deleting a previous fingerprint template in the fingerprint template library.

* * * * *